United States Patent [19]

Daigle et al.

[11] 3,899,619

[45] Aug. 12, 1975

[54] 1,3,5-TRIAZA-7-PHOSPHAADAMANTANE AND DERIVATIVES AS FLAME RETARDANTS FOR TEXTILES

[75] Inventors: Donald J. Daigle, New Orleans; Armand B. Pepperman, Jr., Metairie; Sidney L. Vail, New Orleans, all of La.

[73] Assignee: The United States of America, as represented by the Secretary of Agriculture, Washington, D.C.

[22] Filed: Aug. 24, 1973

[21] Appl. No.: 391,189

[52] U.S. Cl. ............. 427/396; 252/8.1; 260/248.5; 260/248 NS; 260/DIG. 24; 427/366; 428/276; 428/277; 428/921
[51] Int. Cl.$^2$...................... C09D 5/18; C09K 3/28
[58] Field of Search.... 260/248.5, 248 NS, DIG. 24; 117/136, 143 R; 252/8.1; 106/15 FP; 161/403; 427/396, 366; 428/276, 277, 921

[56] References Cited

UNITED STATES PATENTS

| | | | |
|---|---|---|---|
| 3,476,799 | 11/1969 | Vogt et al. | 260/248.5 X |
| 3,619,113 | 11/1971 | Stockel et al. | 117/136 X |
| 3,644,083 | 2/1972 | Stockel et al. | 117/136 X |

FOREIGN PATENTS OR APPLICATIONS

| | | | |
|---|---|---|---|
| 40,957 | 9/1965 | Germany | 117/136 |
| 57,360 | 6/1969 | Poland | 117/136 |

*Primary Examiner*—Harry J. Gwinnell
*Attorney, Agent, or Firm*—M. Howard Silverstein; Max D. Hensley

[57] ABSTRACT

Cellulosic textile is rendered flame retardant by impregnating with 1,3,5-triaza-7-phosphaadamantane, 1,3,5-triaza-7-phosphaadamantane 7-oxide, 1-methyl-1-azonia-3,5-diaza-7-phosphaadamantane iodide or 1-methyl-1-azonia-3,5-diaza-7-phosphaadamantane 7-oxide iodide.

5 Claims, No Drawings

1,3,5-TRIAZA-7-PHOSPHAADAMANTANE AND DERIVATIVES AS FLAME RETARDANTS FOR TEXTILES

A non-exclusive, irrevocable, royalty-free license in the invention herein described, throughout the world for all purposes of the United States Government, with the power to grant sublicense for such purposes, is hereby granted to the Government of the United States of America.

This invention relates to a monophosphorus analog of hexamethylenetetramine and to derivatives therefrom. More specifically this invention relates to 1,3,5-triaza-7-phosphaadamantane and its derivatives, 1,3,5-triaza-7-phosphaadamanatane 7-oxide, 1-methyl-1-azonia-3,5-diaza-7-phosphaadamantane iodide, and 1-methyl-1-azonia-3,5-diaza-7-phosphaadamantane 7-oxide iodide, which are useful as flame retardants for cellulosic textiles and to methods of their preparation.

The main object of the instant invention is to disclose the compound 1,3,5-triaza-7-phosphaadamantane produced by processes of the instant invention.

A second object of the instant invention is to disclose the derivatives of 1,3,5-triaza-7-phosphaadamantane, 1,3,5-triaza-7-phosphaadamantane 1-oxide, 1-methyl-1-azonia-3,5-diaza-7-phosphaadamantane iodide, and 1-methyl-1-azonia-3,5-diaza-7-phosphaadamantane 7-oxide iodide.

Searching the prior art we find that the simplest process for the preparation of tris(aminomethyl)phosphines is conducted by reacting a secondary amine with tris(hydroxymethyl)phosphine by itself or in the presence of formaldehyde [K. A. Petrov, V. A. Parshina, B. A. Orlov and G. M. Trypina, Zhur. Obshch. Khim., 32, 4017 (1962)]. The amine of the present invention differs from those of the prior art in that hexamethylenetetramine or a solution of formaldehyde and ammonia is employed rather than simple secondary amines. Thus, the phosphine of the present invention is of a new type. In the course of the investigation we have found that a phosphine ($C_6H_{12}N_3P$) having the graphic formula can be prepared by reacting

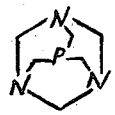

tris(hydroxymethyl)phosphine with hexamethylenetetramine, preferably in the presence of formaldehyde.

In accordance with the present invention the reaction of tris(hydroxymethyl)phosphine with hexamethylenetetramine in the presence of formaldehyde is carried out by mixing cold (0°–25°C) dilute (5–25 times weight of the reagent, tris(hydroxymethyl)phosphine and hexamethylenetetramine) solutions of the reagent, adding formaldehyde, and letting the final solution stand at room temperature overnight. This same procedure may be carried out using a solution of formaldehyde and ammonia in place of hexamethylenetetramine. The phosphine product was identified by infrared and proton magnetic resonance spectra, and by elemental analysis.

Further, in accordance with the present invention 1,3,5-triaza-7-phosphaadamantane 7-oxide was prepared by reaction of 1,3,5-triaza-7-phosphaadamantane with a peroxide in an appropriate solvent.

In accordance with the present invention 1-methyl-1-azonia-3,5-diaza-7-phosphaadamantane iodide was prepared by reaction of 1,3,5-triaza-7-phosphaadamantane with methyl iodide in an appropriate solvent.

In accordance with the present invention 1-methyl-1-azonia-3,5-diaza-7-phosphaadamantane 7-oxide iodide was prepared by reaction of 1,3,5-triaza-7-phosphaadamantane 7-oxide with methyl iodide in an appropriate solvent.

These compounds are useful as flame retardants for cellulosic material and also as intermediates for other chemical compounds and polymers. Cotton fabric was made flame retardant by impregnating the fabric with a 15% aqueous solution of the compound and drying the fabric. The concentration of the flame retardant may be varied above or below 15% depending on the degree of flame retardancy desired.

The following examples illustrate the methods of carrying out the invention and are included for purposes of illustration, not as a limitation thereof.

EXAMPLE 1

Preparation of 1,3,5-triaza-7-phosphaadamantane. Solutions (70 g of $H_2O$) of tris(hydroxymethyl)phosphine (3.1 g, 0.025 mole) and hexamethylenetetramine (3.5 g, 0.025 mole) were cooled to 0°–10°C and then mixed together. Formalin (8.0 g, 0.1 mole) was then added and this final solution allowed to stand at room temperature for 15 hours. The solution was allowed to evaporate at room temperature and the residue selectively recrystallized in ethanol to yield 1.57 grams (40% yield) of 1,3,5-triaza-7-phosphaadamantane.

Analysis: Calcalated for $C_6H_{12}N_3P$: C, 45.86; H, 7.64; N, 26.75; P, 19.75, mol. wt., 157. Found: C, 45.63; H, 7.70; N, 26.52; P, 19.83, mol. wt., 158.

EXAMPLE 2

Preparation 1,3,5-triaza-7-phosphaadamantane 7-oxide. To a 20 ml methanolic solution of 1,3,5-triaza-7-phosphaadamantane (0.5 g, 0.0032 mol) was added as 20 ml ethanolic solution of hydrogen peroxide (30% solution, 0.5 g, 0.004 mole). The solution was stirred for 20 minutes and through filtration and evaporation 0.44 g of crude 1,3,5-triaza-7-phosphaadamanatane 7-oxide (80% yield) was obtained. Analysis: Calculated for $C_6H_{12}N_3PO$: C, 41.62; H, 6.92; N, 24.28; P, 17.92; mol. wt. 173. Found: C, 41.75; H, 7.02; N, 24.15; P, 17.99; mol. wt., 169.

EXAMPLE 3

Preparation of 1-methyl-1-azonia-3,5-diaza-7-phosphaadamantane iodide. 1,3,5-Triaza-7-phosphaadamantane (0.5 g, 0.0032 mole) and methyl iodide (0.46 g, 0.0032 mole) were refluxed in 40 ml acetone for one hour. The solution was filtered to yield 0.91 g of crude 1-methyl-1-azonia-3,5-diaza-7-phosphaadamantane iodide (96% yield). [m.p. 203°–4°C (methanol-ethyl acetate)]

Analysis: Calculated for $C_7H_{15}N_3PI$: C, 28.09; H, 5.02; N, 14.05; P, 10.37; I, 42.43. Found: C, 28.06; H, 5.06; N, 14.26; P, 10.37; I, 42.43.

EXAMPLE 4

Preparation of 1-methyl-1-azonia-3,5-diaza-7- phosphaadamantane 7-oxide iodide. 1,3,5-Triaza-7-phosphaadamantane 7-oxide (0.2 g, 0.00115 mole) and methyl iodide (0.2 g, 0.0014 mole) were reflexed in 40 ml of a 1:1 methanol-ethanol mixture for one hour. Addition of an excess (15 ml) of ethyl acetate yielded 0.32 g of crude 1-methyl-1-azonia-3,5-diaza-7-phosphaadamantane 7-oxide iodide (88% yield). [m.p. 213°–4°C (methanol-ethyl acetate)] Analysis: Calculated for $C_7H_{15}N_3POI$: C, 26.67; H, 4.76; N, 13.33; P, 9.84; I, 40.32. Found: 26.54; H, 4.75; N, 13.43; P, 9.92; I, 40.32.

EXAMPLE 5

Solutions of ammonia and formaldehyde may be used in place of hexamethylenetetramine to prepare 1,3,5-triaza-7-phosphaadamantane. A cold (5°–10°C) solution (70 g) containing formalin (20 g, 0.267 mole) and ammonium hydroxide (28.5%, 6.0 g, 0.1 mole) was mixed with a cold (5°–10°C) solution (70 g) of tris(hydroxymethyl)phosphine (3.1 g; 0.025 mole) and solution solutioni allowed to stand at room temperature for 15 hours. Evaporation at room temperature and selective recrystallization yielded 1.57 g of 1,3,5-triaza-7-phosphaadamantane (40% yield).

EXAMPLE 6

Fabric Treatment:

A water solution containing 15% by weight of 1,3,5-triaza-1-phosphaadamantane was applied to 8 oz. cotton sateen fabric by passing through squeeze rolls to an 80% wet pickup and drying for 4 minutes at 90°C. The fabric had a 12% weight gain and was flame retardant.

The fabric treatments were evaluated by a well known rapid evaluation flame retardancy test which consists of cutting a small specimen (about 1 cm. × 7 cm.) of the fabric to be evaluated, placing the specimen above the flame of a kitchen match with the long axis of the fabric specimen at an angle of 180° to the flame, igniting the specimen (if it can ignite), removing the flaming specimen from the flame, and rotating the specimen until the flame is extinguished and recording that angle. (The 0° angle would be where the flame is at the top of the specimen, and the most severe test would be where the flame would be at the bottom. This would be the 180° angle.)

The specimens of Example 1 did not support combustion upon being submitted to this test, that is, the flame was extinguished at a 135° angle; therefore, they passed the flame retardancy test.

The same results were obtained with fabrics treated in the same manner with compounds prepared as described in Examples (2), (3) and (4).

We claim:

1. A process for imparting to a cellulosic textile the quality of flame retardancy, comprising: (a) impregnating the cellulosic textile with an aqueous solution containing about 15% by weight of a phosphine compound selected from the group consisting of 1,3,5-triaza-7-phosphaadamantane, 1,3,5-triaza-7-phosphaadamantane 7-oxide, 1-methyl-1-azonia-3,5-diaza-7-phosphaadamantane iodide, and 1-methyl-1-azonia-3,5-diaza-7-phosphaadamantane 7-oxide iodide to a weight pickup of about 80%, and (b) drying the wet impregnated textile for about 5 minutes at about 80°C to obtain a treated fabric with about 12% weight gain.

2. The process of claim 1 wherein the compound is 1,3,5-triaza-7-phosphaadamantane.

3. The process of claim 1 wherein the compound is 1,3,5-triaza-7-phosphaadamantane 7-oxide.

4. The process of claim 1 wherein the compound is 1-methyl-1-azonia-3,5-diaza-7-phosphaadamantane iodide.

5. The process of claim 1 wherein the compound is 1-methyl-1-azonia-3,5-diaza-7-phosphaadamantane 7-oxide iodide.

* * * * *